US012299298B1

(12) United States Patent
Gupta et al.

(10) Patent No.: US 12,299,298 B1
(45) Date of Patent: May 13, 2025

(54) DETERMINING WHETHER TO COMPRESS DATA AT A SOURCE DEVICE TO TRANSMIT TO A TARGET DEVICE

(71) Applicant: INTERNATIONAL BUSINESS MACHINES CORPORATION, Armonk, NY (US)

(72) Inventors: Lokesh Mohan Gupta, Tucson, AZ (US); Matthew G. Borlick, Tucson, AZ (US); Beth Ann Peterson, Tucson, AZ (US); Clint A. Hardy, Tucson, AZ (US); Roger G. Hathorn, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/412,041

(22) Filed: Jan. 12, 2024

(51) Int. Cl.
*G06F 12/00* (2006.01)
*G06F 3/00* (2006.01)
*G06F 3/06* (2006.01)

(52) U.S. Cl.
CPC .......... *G06F 3/0626* (2013.01); *G06F 3/0647* (2013.01); *G06F 3/067* (2013.01)

(58) Field of Classification Search
CPC ....... G06F 3/0626; G06F 3/0647; G06F 3/067
USPC .......................................................... 711/171
See application file for complete search history.

(56) References Cited

U.S. PATENT DOCUMENTS

| | | | | |
|---|---|---|---|---|
| 6,397,230 | B1 * | 5/2002 | Carmel | H04L 9/40 715/209 |
| 6,820,133 | B1 * | 11/2004 | Grove | H04L 69/08 709/241 |
| 7,299,300 | B2 * | 11/2007 | Desai | H04L 69/04 370/477 |
| 7,844,705 | B2 * | 11/2010 | Jones | H04L 65/752 709/224 |
| 8,156,241 | B1 * | 4/2012 | Mukherjee | H04L 69/04 709/236 |
| 9,048,862 | B2 * | 6/2015 | Condict | H03M 7/607 |
| 9,049,246 | B2 * | 6/2015 | Vecera | H04L 67/02 |

(Continued)

OTHER PUBLICATIONS

"A Method for Dynamically Load-Balancing Storage Compression Between Storage Controllers and Hosts," IP.com, IP.com No. IPCOM000215164D, Feb. 21, 2012, 3 pp.

(Continued)

*Primary Examiner* — Sheng Jen Tsai

(74) *Attorney, Agent, or Firm* — Konrad, Raynes, Davda & Victor LLP; David W. Victor

(57) ABSTRACT

Provided are a computer program product, system, and method for determining whether to compress data at a source device to transmit to a target device. A determination is made of network bandwidth between the source device and the target device. The source device transmits data to the target device. A determination is made of source available processor resources on the source device and target available processor resources on the target device. A determination is made as to whether to compress data at the source device to transmit to the target device based on the network bandwidth, the source available processor resources, and the target available processor resources. Compression is initiated, on the source device, of the data to transmit to the target device in response to determining that the source device is to compress the data.

23 Claims, 4 Drawing Sheets

(56) References Cited

U.S. PATENT DOCUMENTS 10,200,447 B2 * 2/2019 Gopinath ................ H04L 67/06
10,313,256 B2 * 6/2019 Wang ....................... G06N 7/01
10,419,773 B1 * 9/2019 Wei ........................ H04N 19/46
10,511,694 B2 * 12/2019 Goyal ................... G06F 9/5055
11,093,342 B1 * 8/2021 Heyman ............. H03M 7/3064
2004/0248558 A1 * 12/2004 Chandhok ............... H04L 69/04 455/414.1
2005/0234927 A1 * 10/2005 Bande ..................... G06F 16/27
2006/0085541 A1 * 4/2006 Cuomo ................... H04L 69/24 709/224
2007/0104113 A1 * 5/2007 Mega ...................... H04L 43/00 370/252
2012/0221744 A1 * 8/2012 Heywood ............. G06F 9/4862 709/247
2012/0314761 A1 * 12/2012 Melnyk ............ H04N 21/26258 375/E7.198
2014/0181032 A1 * 6/2014 Kumarasamy .......... G06F 3/067 707/640
2016/0098439 A1 * 4/2016 Dickie .................. G06F 16/215 707/693
2016/0127490 A1 * 5/2016 Li ........................... H04L 43/08 709/247
2016/0306922 A1 * 10/2016 van Rooyen .......... G16B 50/30
2017/0123704 A1 * 5/2017 Sharma ................. H03M 7/607
2018/0048686 A1 * 2/2018 Jang ........................ H04L 67/34
2018/0181878 A1 * 6/2018 Kasiviswanathan ......................... G06F 21/6245
2018/0278629 A1 * 9/2018 McGrew ............. H04L 63/1416
2019/0013965 A1 * 1/2019 Sindhu ................ H04L 12/4633
2019/0188106 A1 * 6/2019 Takahashi ........... G06F 11/3636
2019/0243547 A1 * 8/2019 Duggal ................. G06F 3/0619
2020/0258263 A1 * 8/2020 Ray ........................ G06F 12/023
2021/0135683 A1 * 5/2021 Liu ......................... H04L 69/04
2021/0281491 A1 * 9/2021 Yelahanka Raghuprasad ............. H04L 41/16
2021/0311656 A1 * 10/2021 Ryu ...................... G06F 3/0604
2022/0283707 A1 * 9/2022 Ayzenberg .......... G06F 11/1451
2022/0283724 A1 * 9/2022 Malamut ............... G06F 3/0619
2023/0262237 A1 * 8/2023 Mitra ................... H04N 19/176
2023/0350202 A1 * 11/2023 Mayrand .......... H04N 21/25858
2024/0111567 A1 * 4/2024 Igelka ................... G06F 9/4856
2024/0114200 A1 * 4/2024 Narayanasamy .. H04N 21/8455

OTHER PUBLICATIONS

"A Method To Make Storage System Energy Efficiency With Awareness of Application Performance," IP.com, IP.com No. IPCOM000190491D, Dec. 3, 2009, 4 pp.

"Aligning Partitions to Maximize Storage Performance," Oracle, Nov. 2012, 45 pp.

"Method and System for Recovering From Partial Writes On a Storage System Using Log Structured Array," IP.com, IP.com No. IPCOM000248720D, Dec. 29, 2016, 6 pp.

"Unleashing Application Performance With Solid-State Drives and Sun Servers," Oracle, May 2010, 15 pp.

* cited by examiner

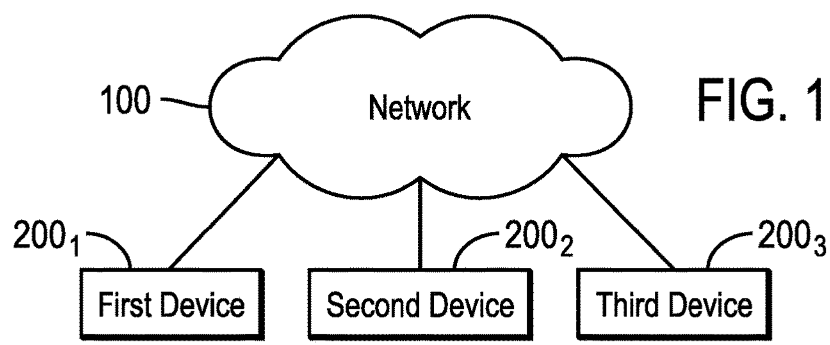
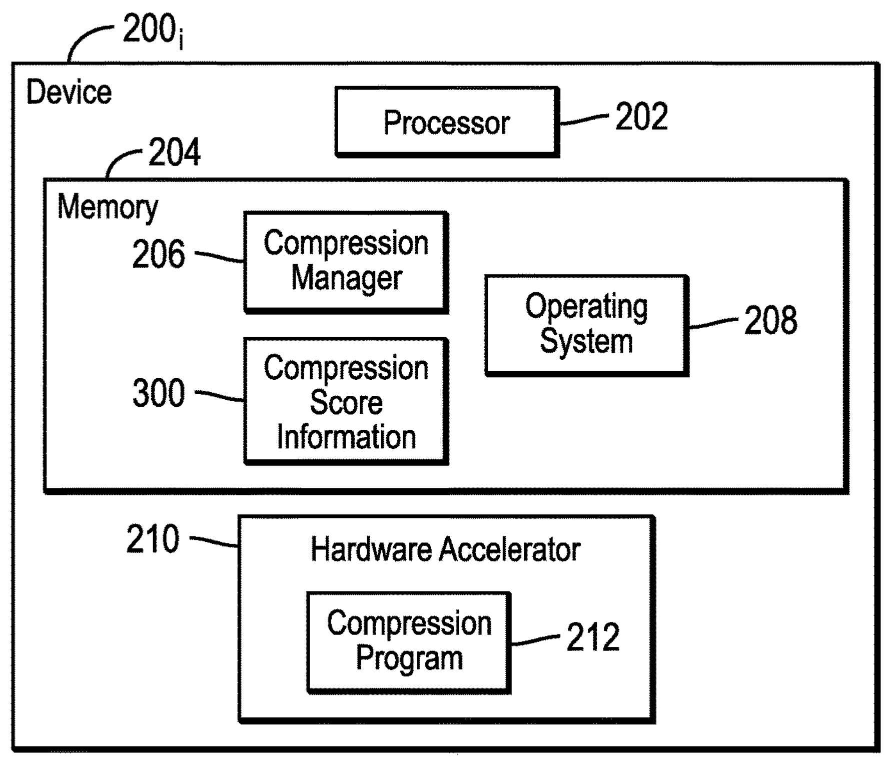
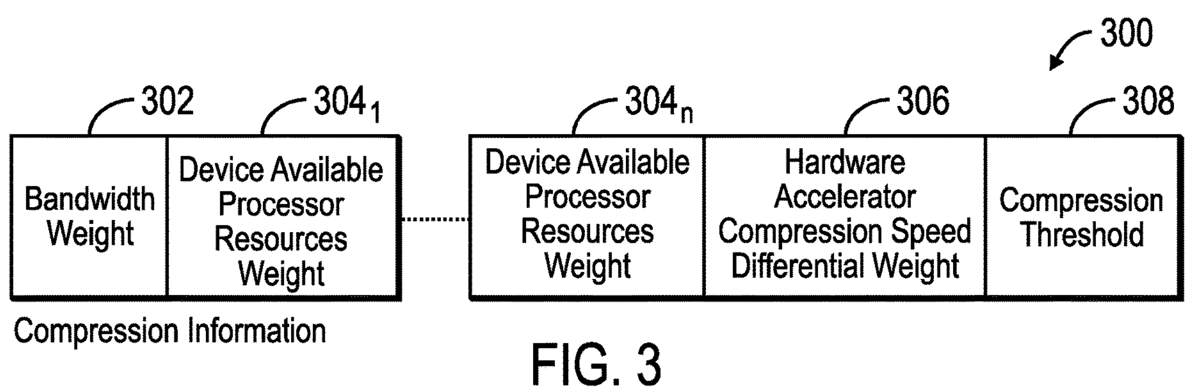
FIG. 3

DETERMINING WHETHER TO COMPRESS DATA AT A SOURCE DEVICE TO TRANSMIT TO A TARGET DEVICE

BACKGROUND OF THE INVENTION

1. Field of the Invention

The present invention relates to a computer program product, system, and method for determining whether to compress data at a source device to transmit to a target device.

2. Description of the Related Art

In an integrated system, such as a host and storage server environment, data can be compressed at different locations, such as at the host system before transmitting to a storage server or at the storage server before storing the data in disk. Data can also be compressed at different levels of a hierarchical storage system, such as at the disk drive level or before being written to archival storage.

SUMMARY

Provided are a computer program product, system, and method for determining whether to compress data at a source device to transmit to a target device. A determination is made of network bandwidth between the source device and the target device. The source device transmits data to the target device. A determination is made of source available processor resources on the source device and target available processor resources on the target device. A determination is made as to whether to compress data at the source device to transmit to the target device based on the network bandwidth, the source available processor resources, and the target available processor resources. Compression is initiated, on the source device, of the data to transmit to the target device in response to determining that the source device is to compress the data.

BRIEF DESCRIPTION OF THE DRAWINGS

FIG. 1 illustrates an embodiment of a network computing environment.

FIG. 2 illustrates an embodiment of a computing device in the network computing environment.

FIG. 3 illustrates an embodiment of compression information used to generate a compression score.

DETAILED DESCRIPTION

Figure 4A:
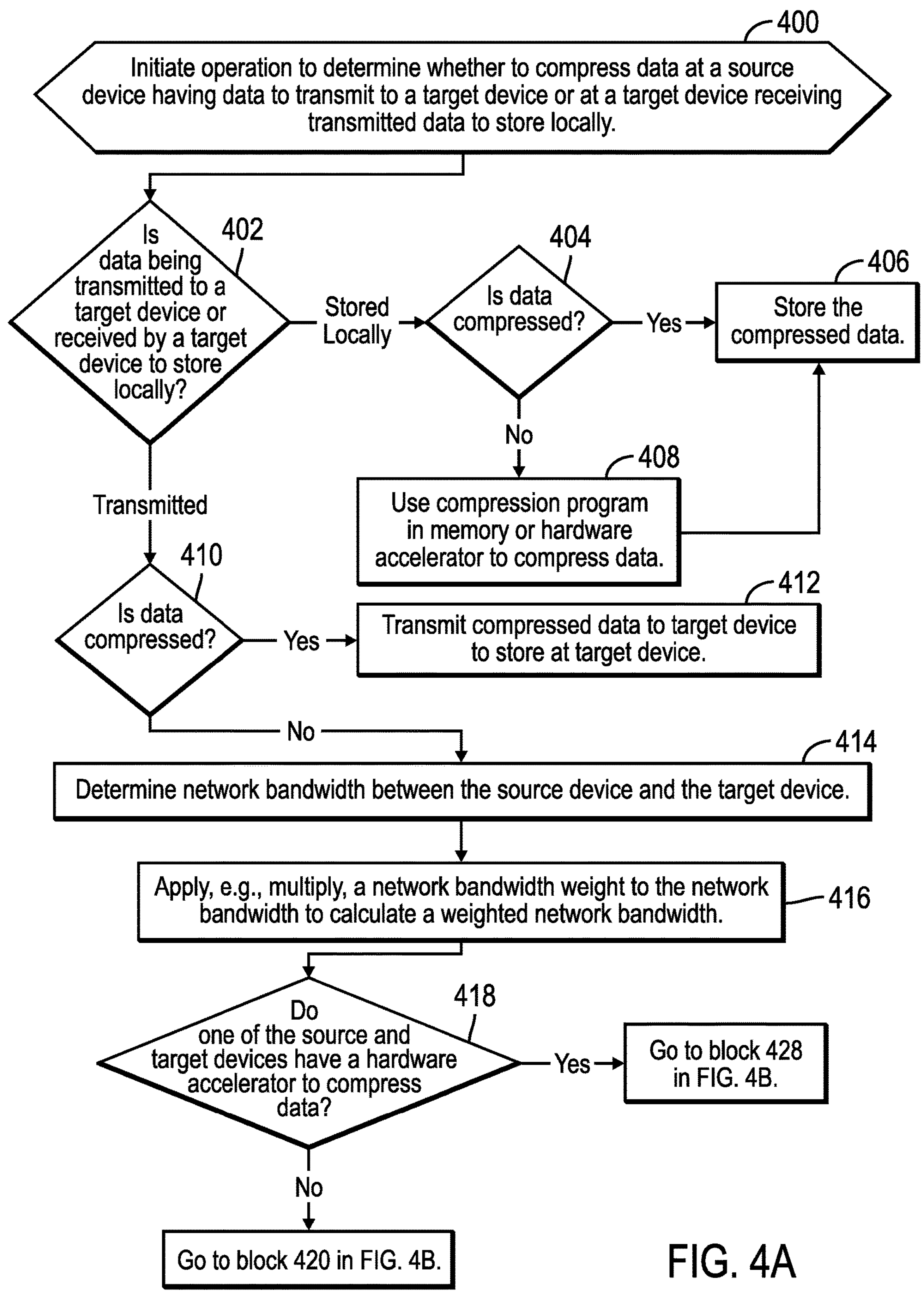
FIGS. 4A and 4B illustrate an embodiment of operations to determine whether to compress data at a device.

Described embodiments provide improvements to computer technology to optimize the decision of where to compress data in a network computing environment based on environmental consideration, such as network bandwidth and processor resources available at a source device and target device of a network transmission. Optimizing the decision of where to compress at the source device and target device of a network transmission optimizes network bandwidth by compressing at the source device if available network bandwidth is low and optimizes available processor resource at the source and target devices by preferring to compress at the device having more available processor resources.

FIG. 1 illustrates an embodiment of a network environment. A plurality of devices 2001, 2002, 2003, or any number of devices, are connected to a network 100. FIG. 2 illustrates an embodiment of a device 200*i*, such as one of the devices 2001, 2002, 2003, including a processor 202 and a memory 204. The memory 204 includes a compression manager 206 using compression score information 300 to calculate a compression score used to determine whether to compress data before transmitting to another device, and an operating system 208. The device 200; may optionally include a hardware accelerator 210, implementing a compression program 212 to compress and decompress data. In alternative embodiments, the compression program 212 may comprise computer code implemented in the memory 204.

In one embodiment, the device 2001 may comprise a host system that transmits data to a storage server 2002 to store. The storage server 2003 may transfer data to a lower-level storage system, such as a virtual tape server or tape library. There may be other levels of storage devices. Each of the devices 2001, 2002, 2003, and any other of the devices, may run the compression manager 206 to determine whether to compress data before transmitting to another device.

In certain embodiments, the host 2001 may comprise an enterprise host system that includes an operating system such as, but not limited to, the IBM® Z/OS® operating system, the storage controller 2002 may comprise an enterprise storage controller, such as the International Business Machines Corporation (IBM®) DS8000™ storage controller or storage controllers from other vendors, and the virtual tape server 2003 may comprise a virtual tape library, such as the IBM TS7700 Virtual Tape Library or virtual tape servers from other vendors. (IBM, Z/OS and DS800 are registered trademarks of IBM throughout the world).

The compression manager 206, operating system 208, and compression program 212 may comprise program code loaded into the memory 204 and executed by the processor 202. Alternatively, some or all of the functions may be implemented as microcode or firmware in hardware devices, such as in Application Specific Integrated Circuits (ASICs) and Field Programmable Gate Array (FPGA). The hardware accelerator 210 may be implemented in an ASIC or FPGA.

The memory 114 may comprise suitable volatile or non-volatile memory devices.

The network 100 may comprise a Storage Area Network (SAN), a Local Area Network (LAN), a Wide Area Network (WAN), the Internet, and Intranet, etc.

FIG. 3 illustrates an embodiment of compression score information 300 used by the compression manager 206 to determine whether to compress data before transmitting to another device 200*i*, including: a bandwidth weight 302 to apply to available network bandwidth between a source device 200*s* transmitting data and a target device 200T receiving data, wherein the source 200*s* and target 200*r* may comprise any of the devices 2001, 2002, 2003; a plurality of device available processor cycle weights 3041 . . . 304*n* for n different types of devices to apply to available processor resources at a device, such as Central Processing Unit (CPU) cycles available on a device or Million Instructions per Second (MIPS) available at the processor 202 of a device; a hardware accelerator compression speed differential weight 306 to apply to a differential in compression speed at a target device 200*r* and a source device 200*s* when at least one of the devices 200T, 200*s* includes a hardware accelerator 210. The weights 302, 3041 . . . 304*n*, and 306 may be set empirically based on best determined values in testing or production environments or set by a user based on user preferences.

Figure 4B:
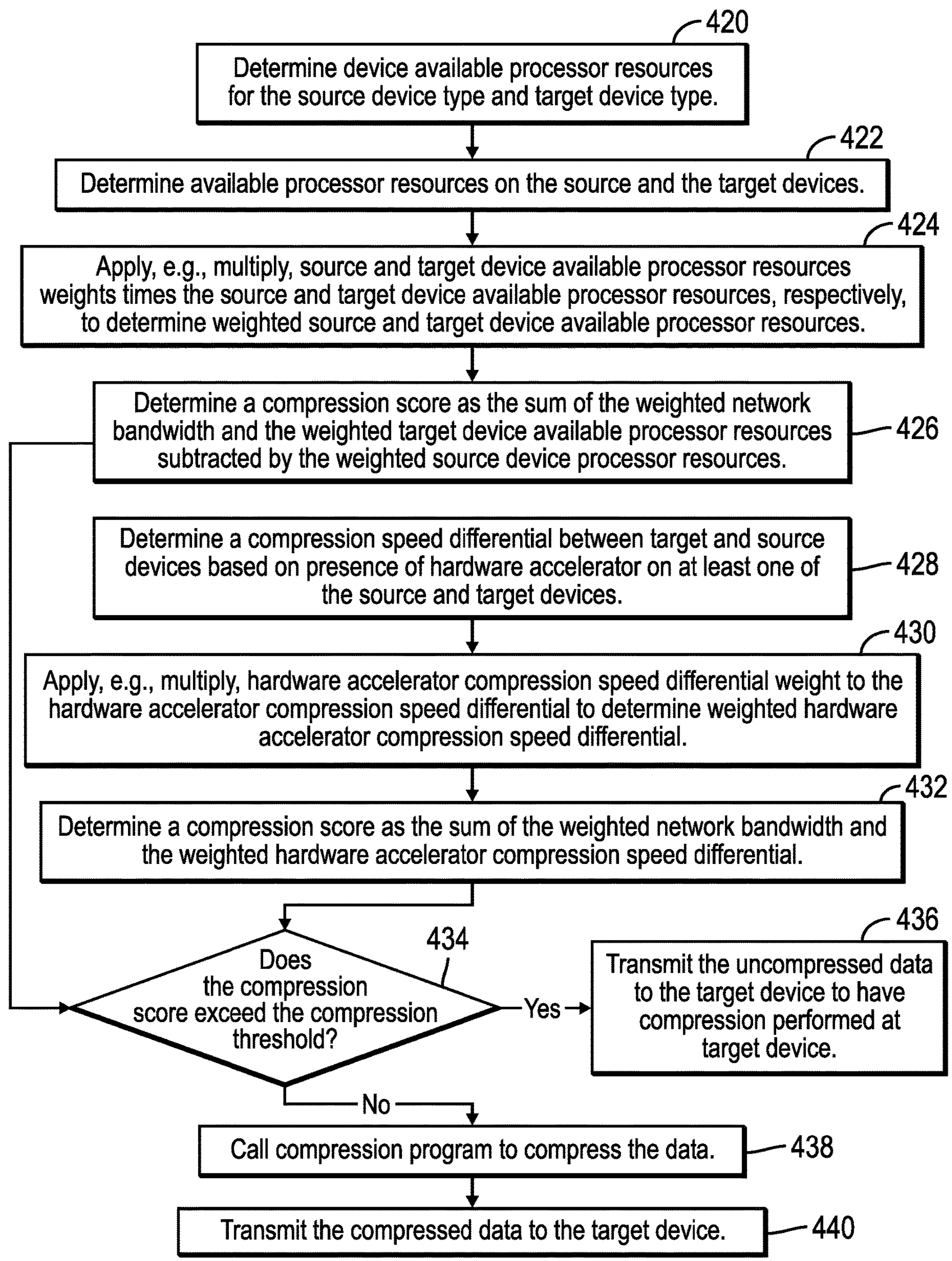

FIGS. 4A and 4B illustrate an embodiment of operations performed by the compression manager 206 to determine whether the source device 200*s* should compress data or transmit the data uncompressed to the target device 200T. Upon initiating (at block 400) an operation to determine whether to compress data, a determination is made (at block 402) whether the data is to transmit to a target device 200*r* or data received from a source device 200*s* to store locally. If (at block 402) the data is to store locally at the target device 200T and if (at block 404) the data is already compressed, such as compressed at the source device 200*s*, then the compressed data is stored (at block 406) at the target device 200T. If (at block 404) the received data is not compressed, such as the source device 200*s* determined to not compress the data, then the compression program 212 in the memory 204 or a hardware accelerator 210 is used (at block 408) to compress the data to store (at block 406) at the target device 200T.

If (at block 402) the data is to transmit to a target device 200T, then the compression manager 206 determines (at block 410) whether the data to transmit is compressed. If so, then the compressed data is transmitted (at block 412) to the target device 200T to store the compressed data. The operation at block 412 would occur if the source device 200*s* had previously stored the data as compressed. If (at block 410) the data is not compressed, then the compression manager 206 determines (at block 414) the network bandwidth between the source device 200*s* and the target device 200T. The compression manager 206 applies (at block 416), such as multiplies, the network bandwidth weight 302 times the determined network bandwidth to calculate a weighted network bandwidth.

If (at block 418) one of the source 200*s* and target 200*r* devices does not have a hardware accelerator 210 to compress data, then control proceeds to block 420 in FIG. 4B. Otherwise, if (at block 418) the source 200*s* and/or target 200T device has a hardware accelerator 210, then control proceeds to block 428 in FIG. 4B.

At block 420, the compression manager 206 determines the device available processor resources weights 304*s*, 304T for the source device 200*s* type and target device 200 type. The available processor resources, e.g., MIPs, on the source device 200*s* and target device 200T are determined (at block 422). The compression manager 206 multiplies (at block 424) the source and target device available processor resources weights 304*s*, 304T times the source and target device available processor resources, respectively, to determine weighted source and target device available processor resources. A compression score is calculated (at block 426) as the sum of the weighted network bandwidth and the weighted target device available processor resources, subtracted by the weighted source device available processor resources.

If one of the source 200*s* and target 200T devices has a hardware accelerator 210 to perform compression, then the compression manager 206 determines (at block 428) a compression speed differential between the target 200T and source 200*s* devices based on the presence of a hardware accelerator on at least one of the source 200*s* and target 200T devices. A positive differential indicates the target device 200T has a higher compression speed than the source device 200*s* and a negative differential indicates the source device 200*s* has a higher compression speed over the target device 200T. The compression manager 206 multiplies (at block 430) the hardware accelerator compression speed differential weight 306 times the hardware accelerator compression speed differential to determine weighted hardware accelerator compression speed differential. In alternative embodiments, the weights 304*s*, 304T, and 306 may be applied to the measured values according to a function other than straight multiplication.

The compression manager 206 determines (at block 432) a compression score as the sum of the weighted network bandwidth and the weighted hardware accelerator compression speed differential. After calculating the compression score at block 426 or 432, if (at block 434) the calculated compression score exceeds the compression threshold 308, then the data is transmitted (at block 436) uncompressed to the target device 200T. If (at block 434) the compression threshold 308 is not exceeded, then the compression manager 206 calls (at block 438) the compression program 212 in the memory 204 or the hardware accelerator 210 to compress the data and transmit (at block 440) the compressed data to the target device 200T.

With the embodiment of FIGS. 4A and 4B, when a source device is preparing to transmit data to be compressed, a determination is made of the network bandwidth and available processor resources at the source and target devices. Higher bandwidth indicates the data may be transmitted uncompressed because there is less need to reduce the size of the data to transmit to conserve bandwidth. Further, a higher processing capability or higher compression speed at the target device also favors transmitting the data uncompressed to the target device to compress. Lower available bandwidth and greater compression processing capabilities on the source device indicates to compress on the source device. Described embodiments thus optimize the compression operation based on parameters concerning network bandwidth and processing capabilities of the source and target device to determine whether to compress data on the source device or transmit to the target device to optimize compression.

In described embodiments, the source device 2001, which may comprise a host system, may transmit the data to the target device 2002, which may comprise a storage server, uncompressed. In such case, the second device 2002 may store the data uncompressed or store compressed. If the second device 2002 that stored the data uncompressed is to later transmit the data to a third device 2003, such as a virtual tape server, then the compression manager 206 in the second device 2002 may perform the operations of FIGS. 4A and 4B to determine whether to transmit the data compressed or uncompressed to the third device 2003.

In an alternative embodiment, the compression manager 206 may comprise a classification machine learning model that receives as input the network bandwidth and the device available processor resources and/or the hardware accelerator compression speed differential to output a classification to compress or not compress at the source device 200*s*. For artificial neural network program implementations, the neural network may be trained using backward propagation to adjust weights and biases at nodes in a hidden layer to produce their output, indicating of whether to locally compress or transmit data uncompressed, based on the received inputs. In backward propagation used to train a neural network machine learning module, biases at nodes in the hidden layer are adjusted accordingly to produce the desired output of whether to compress or not compress data to transmit having specified confidence levels based on the input parameters. For instance, the input to the compression manager 206 may comprise the network bandwidth and the device available processor resources and/the hardware accelerator compression speed differential, and the output may comprise indication of whether to compress and not compress before transmitting with confidence levels. The compression manager 206 may be trained to produce an indication of whether to compress or transmit the data uncompressed based on the inputs. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

In backward propagation used to train a neural network machine learning module, such as the compression manager 206, margin of errors are determined based on a difference of the calculated predictions and user rankings of the output. Biases (parameters) at nodes in the hidden layer are adjusted accordingly to minimize the margin of error of the error function. The compression manager 206 may further be implemented using an unsupervised machine learning module, or machine learning implemented in methods other than neural networks, such as multivariable linear regression models.

The present invention may be a system, a method, and/or a computer program product. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
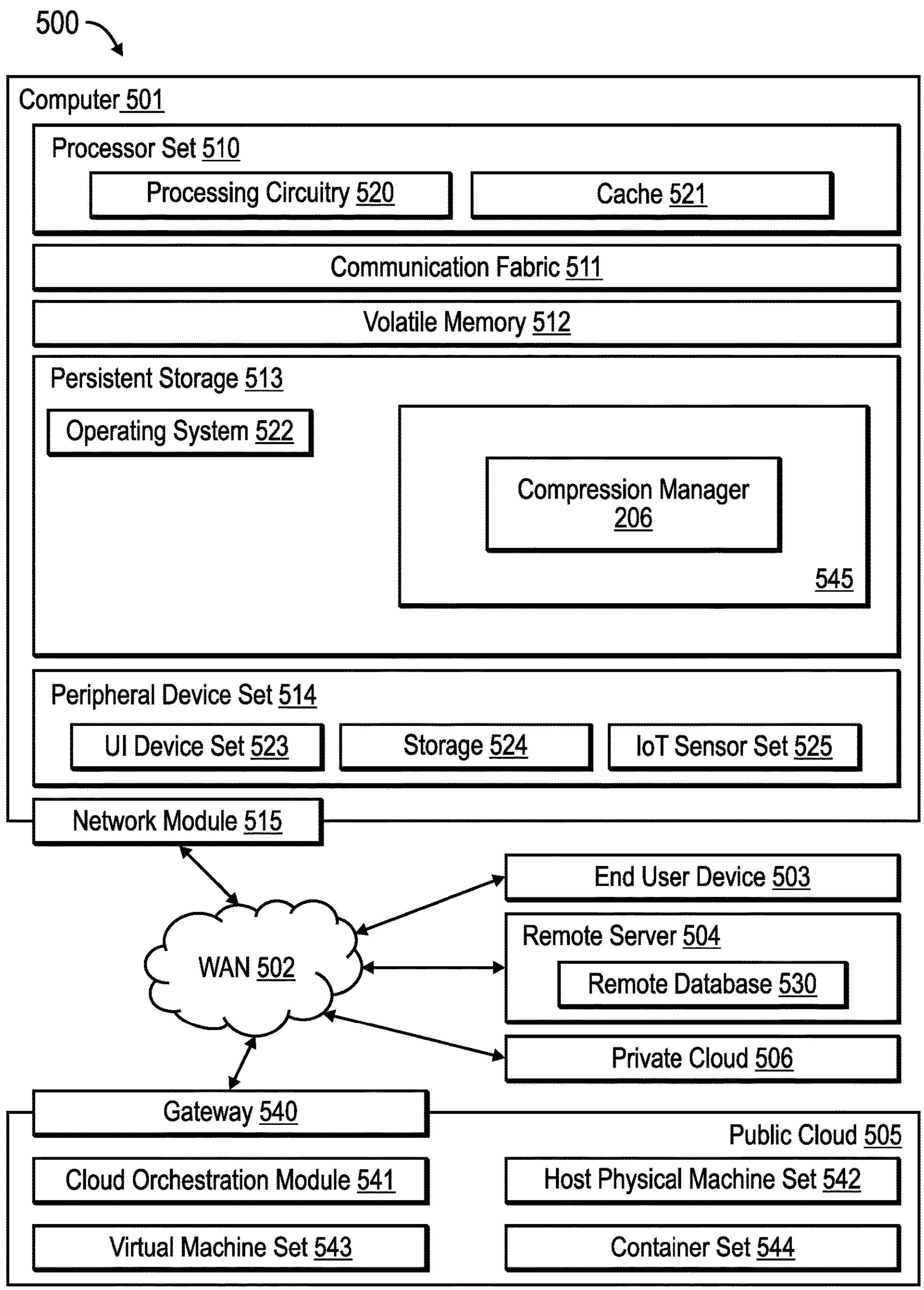
FIG. 5 illustrates a computing environment in which the components of FIG. 1 may be implemented.

With respect to FIG. 5, computing environment 500 contains an example of an environment for the execution of at least some of the computer code involved in performing the inventive methods, such as the compression manager 206, described with respect to FIG. 5, in block 545 to determine whether to transmit data compressed or uncompressed. In addition to block 545, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 545, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip."

In some computing environments, processor set 510 may be designed for working with qubits and performing quantum computing.

Computer-readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 545 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in block 545 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer-readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504. The remove servers 504 may comprise the target device 200T to receive compressed/uncompressed transmitted data.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

CLOUD COMPUTING SERVICES AND/OR MICROSERVICES (not separately shown in FIG. 5): private and public clouds 506 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The letter designators, such as i, n, S, and T, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining whether to compress data at a source device transmitting data to a target device, the computer program product comprising a computer readable storage medium having computer readable program code embodied therein that when executed performs:

determining network bandwidth between the source device and the target device, wherein the source device transmits data to the target device;

determining source available processor resources on the source device and target available processor resources on the target device;

determining whether to compress data at the source device to transmit to the target device based on the network bandwidth, the source available processor resources, and the target available processor resources, wherein a higher target available processor resources contributes to determining not compress the data, wherein a higher network bandwidth contributes to determining to not compress the data, and wherein a higher source available processor resources contributes to determining to compress the data; and initiating compression, on the source device, of the data to transmit to the target device in response to determining that the source device is to compress the data.

2. The computer program product of claim 1, wherein the operations further comprise:

initiating compression, on the target device, of the data received from the source device in response to determining that the source device is not to compress the data.

3. The computer program product of claim 1, wherein the determining whether to compress data at the source device comprises:

calculating a score as a function of the network bandwidth, the source available processor resources, and the target available processor resources, wherein the source available processor resources offsets the network bandwidth and the target available processor resources in the score;

determining whether the score exceeds a threshold, wherein the source device compresses the data to transmit to the target device in response to the score being less than a threshold; and initiating compression at the target device to compress the data received from the source device in response to the score exceeding the threshold.

4. The computer program product of claim 3, wherein the calculating the score as the function comprises adding values based on the network bandwidth and the target available processor resources to the score and subtracting a value based on the source available processor resources from the score.

5. The computer program product of claim 1, wherein the determining whether to compress data at the source device comprises:

multiplying the network bandwidth by a bandwidth weight to produce a weighted network bandwidth;

multiplying the source available processor resources by a source available processor resources weight to produce weighted source available processor resources;

multiplying the target available processor resources by a target processor resources weight to produce a weighted target available processor resources;

calculating a score by adding the weighted network bandwidth and the weighted target available processor resources and by subtracting the weighted source available processor resources, wherein the source device is instructed to compress the data to transmit to the target device in response to the score being less than a threshold; and instructing the target device to compress the data received from the source device in response to the score exceeding the threshold.

6. The computer program product of claim 1, wherein the operations further comprise:

determining whether at least one of the source device and the target device includes a hardware accelerator for compressing data, wherein the determining the source available processor resources and the target available processor resources and determining whether to compress data at the source device are performed in response to determining that neither of the source device nor the target device has a hardware accelerator to compress data.

7. The computer program product of claim 1, wherein the target device comprises a first target device to transmit data to a second target device, wherein the operations further comprise:

determining network bandwidth between the first target device and the second target device;

determining first target available processor resources on the first target device and second target available processor resources on the second target device; and determining whether to compress data at the first target device based on the network bandwidth between the first and the second target devices, the first target available processor resources, and the second target available processor resources;

initiating, at the first target device, compression of the data to transmit to the second target device in response to determining that the first target device compresses data; and initiating, at the second target device, compression of the data received from the first target device in response to determining that the second target device compresses the data.

8. The computer program product of claim 1, wherein the determining whether to compress data at the source device comprises:

inputting the network bandwidth, the source available processor resources, and the target available processor resources to a machine learning classification model to output indication of whether the source device is to compress the data to transmit to the target device.

9. A source device in communication with a target device, comprising:

a processor; and a computer readable storage medium having computer readable program code embodied therein that when executed by the processor performs operations, the operations comprising:

determining network bandwidth between the source device and the target device, wherein the source device transmits data to the target device;

determining source available processor resources on the source device and target available processor resources on the target device;

determining whether to compress data at the source device to transmit to the target device based on the network bandwidth, the source available processor resources, and the target available processor resources, wherein a higher target available processor resources contributes to determining not compress the data, wherein a higher network bandwidth contributes to determining to not compress the data, and wherein a higher source available processor resources contributes to determining to compress the data; and initiating compression, on the source device, of the data to transmit to the target device in response to determining that the source device is to compress the data.

10. The source device of claim 9, wherein the determining whether to compress data at the source device comprises:

calculating a score as a function of the network bandwidth, the source available processor resources, and the target available processor resources, wherein the source available processor resources offsets the network bandwidth and the target available processor resources in the score;

determining whether the score exceeds a threshold, wherein the source device compresses the data to transmit to the target device in response to the score being less than a threshold; and initiating compression at the target device to compress the data received from the source device in response to the score exceeding the threshold.

11. The source device of claim 10, wherein the calculating the score as the function comprises adding values based on the network bandwidth and the target available processor resources to the score and subtracting a value based on the source available processor resources from the score.

12. The source device of claim 9, wherein the determining whether to compress data at the source device comprises:

multiplying the network bandwidth by a bandwidth weight to produce a weighted network bandwidth;

multiplying the source available processor resources by a source available processor resources weight to produce weighted source available processor resources;

multiplying the target available processor resources by a target processor resources weight to produce a weighted target available processor resources;

calculating a score by adding the weighted network bandwidth and the weighted target available processor resources and by subtracting the weighted source available processor resources, wherein the source device is instructed to compress the data to transmit to the target device in response to the score being less than a threshold; and instructing the target device to compress the data received from the source device in response to the score exceeding the threshold.

13. The source device of claim 9, wherein the operations further comprise:

determining whether at least one of the source device and the target device includes a hardware accelerator for compressing data, wherein the determining the source available processor resources and the target available processor resources and determining whether data to compress data at the source device are performed in response to determining that neither of the source device nor the target device has a hardware accelerator to compress data.

14. The source device of claim 9, wherein the determining whether to compress data at the source device comprises:

inputting the network bandwidth, the source available processor resources, and the target available processor resources to a machine learning classification model to output indication of whether the source device is to compress the data to transmit to the target device.

15. A method for determining whether to compress data at a source device transmitting data to a target device, comprising:

determining network bandwidth between the source device and the target device, wherein the source device transmits data to the target device;

determining source available processor resources on the source device and target available processor resources on the target device;

determining whether to compress data at the source device to transmit to the target device based on the network bandwidth, the source available processor resources, and the target available processor resources, wherein a higher target available processor resources contributes to determining not compress the data, wherein a higher network bandwidth contributes to determining to not compress the data, and wherein a higher source available processor resources contributes to determining to compress the data; and initiating compression, on the source device, of the data to transmit to the target device in response to determining that the source device is to compress the data.

16. The method of claim 15, wherein the determining whether to compress data at the source device comprises:

calculating a score as a function of the network bandwidth, the source available processor resources, and the target available processor resources, wherein the source available processor resources offsets the network bandwidth and the target available processor resources in the score;

determining whether the score exceeds a threshold, wherein the source device compresses the data to transmit to the target device in response to the score being less than a threshold; and initiating compression at the target device to compress the data received from the source device in response to the score exceeding the threshold.

17. The method of claim 16, wherein the calculating the score as the function comprises adding values based on the network bandwidth and the target available processor resources to the score and subtracting a value based on the source available processor resources from the score.

18. The method of claim 15, wherein the determining whether to compress data at the source device comprises:

multiplying the network bandwidth by a bandwidth weight to produce a weighted network bandwidth;

multiplying the source available processor resources by a source available processor resources weight to produce weighted source available processor resources;

multiplying the target available processor resources by a target processor resources weight to produce a weighted target available processor resources;

calculating a score by adding the weighted network bandwidth and the weighted target available processor resources and by subtracting the weighted source available processor resources, wherein the source device is instructed to compress the data to transmit to the target device in response to the score being less than a threshold; and instructing the target device to compress the data received from the source device in response to the score exceeding the threshold.

19. The method of claim 15, further comprising:

determining whether at least one of the source device and the target device includes a hardware accelerator for compressing data, wherein the determining the source available processor resources and the target available processor resources and determining whether data to compress data at the source device are performed in response to determining that neither of the source device nor the target device has a hardware accelerator to compress data.

20. The computer program product of claim 1, wherein the operations further comprise:

determining whether at least one of the source device and the target device includes a hardware accelerator for compressing data, wherein the determining the source available processor resources and the target available processor resources and the determining whether data to compress data at the source device are not performed in response to the determining that at least one of the source device and the target device has a hardware accelerator to compress data; and determining whether data to compress data at the source device based on the network bandwidth and a compression speed differential between the source device and the target device in response to the determining that at least one of the source device and the target device has a hardware accelerator to compress data, wherein the compression speed differential indicates a compression speed difference due to the hardware accelerator.

21. The computer program product of claim 20, wherein the source available processor resources, the target available processor resources and the network bandwidth are weighted to determine whether to compress data at the source device, and wherein the compression speed differential and the network bandwidth are weighted to determine whether to compress data at the source device.

22. The source device of claim 9, wherein the operations further comprise:

determining whether at least one of the source device and the target device includes a hardware accelerator for compressing data, wherein the determining the source available processor resources and the target available processor resources and the determining whether data to compress data at the source device are not performed in response to the determining that at least one of the source device and the target device has a hardware accelerator to compress data; and determining whether data to compress data at the source device based on the network bandwidth and a compression speed differential between the source device and the target device in response to the determining that at least one of the source device and the target device has a hardware accelerator to compress data, wherein the compression speed differential indicates a compression speed difference due to the hardware accelerator.

23. The method of claim 15, further comprising:

determining whether at least one of the source device and the target device includes a hardware accelerator for compressing data, wherein the determining the source available processor resources and the target available processor resources and the determining whether data to compress data at the source device are not performed in response to the determining that at least one of the source device and the target device has a hardware accelerator to compress data; and determining whether data to compress data at the source device based on the network bandwidth and a compression speed differential between the source device and the target device in response to the determining that at least one of the source device and the target device has a hardware accelerator to compress data, wherein the compression speed differential indicates a compression speed difference due to the hardware accelerator.

* * * * *